J. S. HAMILTON.
FEED TROUGH.
APPLICATION FILED JUNE 18, 1912.
1,044,172.
Patented Nov. 12, 1912.
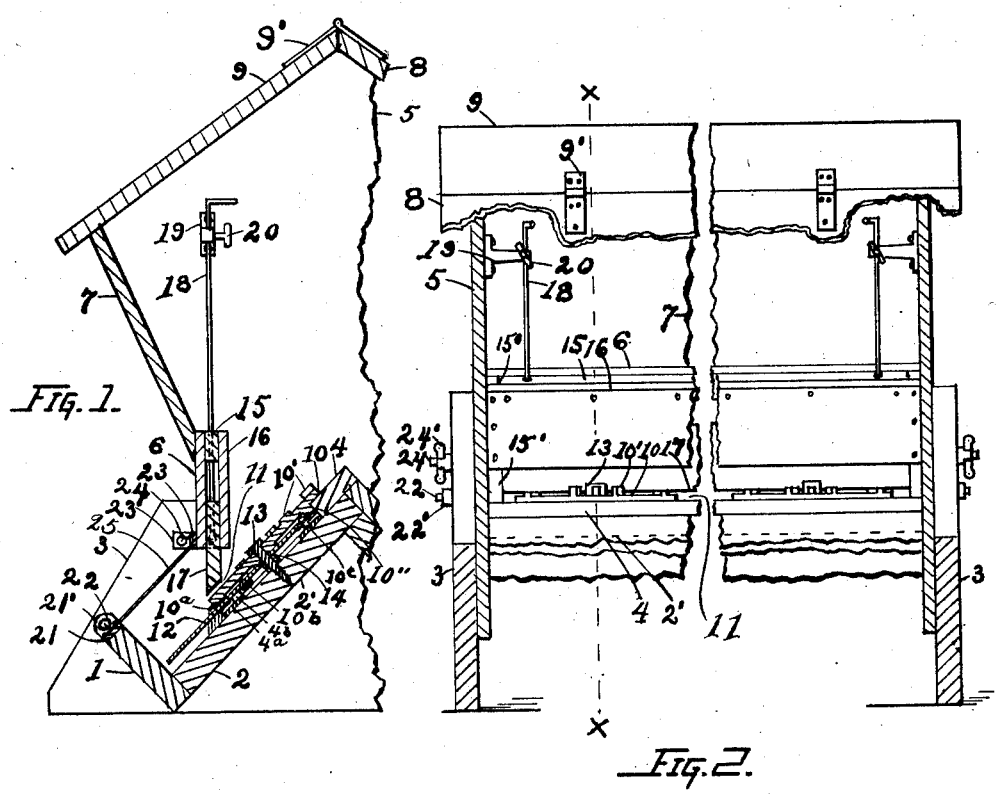
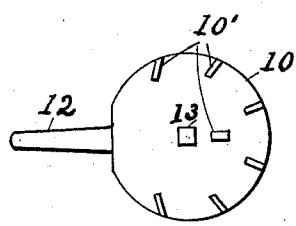
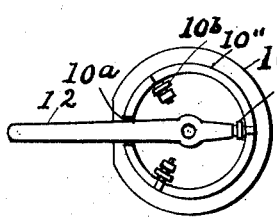
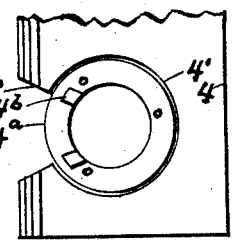
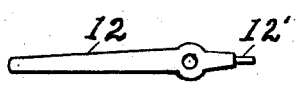
WITNESSES
John J. Hinton
William M. Myers
INVENTOR
Jacob S. Hamilton
BY George W. Hinton
ATTORNEY
COLUMBIA PLANOGRAPH CO., WASHINGTON, D. C.

UNITED STATES PATENT OFFICE.

JACOB S. HAMILTON, OF PLATTSBURG, MISSOURI.

FEED-TROUGH.

1,044,172. Specification of Letters Patent. Patented Nov. 12, 1912.

Application filed June 18, 1912. Serial No. 704,447.

*To all whom it may concern:*

Be it known that I, JACOB S. HAMILTON, a citizen of the United States, residing at Plattsburg, in the county of Clinton and State of Missouri, have invented certain new and useful Improvements in Feed-Troughs, of which the following is a specification, reference being had therein to the accompanying drawing.

My invention relates to improvements in feed troughs, the objects of which are, first, to provide a simple, substantial and durable feed trough which shall be cheap in cost of manufacture, and in which the feed will be evenly distributed to different animals with uniformity. second; to so construct a feed trough that liquid from said trough, animal saliva, and the like, will not be carried by the feed distributers into the feed bin, thereby avoiding clogging of the distributers with moistened feed. third; to provide anti-friction bearings for the feed distributers, thereby providing distributers which will be operated with perfect freedom. fourth; to provide regulating means for the feed discharge opening which will not become clogged by the feed, and by which the width of said opening can be easily and quickly regulated. I attain these objects by the mechanism illustrated in the accompanying drawing, in which:—

Figure 1 is a transverse section on the line X X seen in Fig. 2. Fig. 2 is a side elevation of the parts seen in Fig. 1 looking at an incline, downward toward the left. Fig. 3 is a top plan of one of the feed agitators. Fig. 4 is a bottom plan of an agitator and its attached parts. Fig. 5 is a top plan of a portion of the bin bottom. Fig. 6 is a top plan of agitator arm detached.

Referring to Fig. 1, the feed trough is composed of inclined trough front 1, inclined trough bottom 2, having extended portion 2′ formed therewith, and vertical trough ends 3, substantially secured together, in any suitable manner known to the trough builders' art. In actual practice, said trough is built in duplicate, but since both of said troughs are alike in construction and operation, one of said troughs is neither fully shown nor described.

The feed bin is composed of bin bottom 4, secured on extension 2′, bin ends 5, vertical front 6, inclined front 7, bin top 8 and lid 9 hinged to said top, by hinges 9′.

Referring to Fig. 5, bin bottom 4, has an annular aperture 4′ formed therethrough, said aperture having a vent opening 4″ leading therefrom through the front edge of said bin bottom, for allowing particles of feed to gravitate therethrough from said aperture. Said aperture and vent opening form a countersink in bin bottom 4. Said bin bottom is of any desired length and has as many of said countersinks formed therein as the desired number of feed agitators requires. Since said agitators are alike in construction and operation, a detailed description of one is sufficient. In opening 4′ is secured the annular bearing plate 4ª provided with stop lugs 4ᵇ formed on the upper surface thereof.

Referring to Figs. 1 and 4, agitator plate 10 has agitating lugs 10′ formed on the upper face thereof. The inner ones of said lugs projecting higher and the outer one lower, for adapting the same to agitate feed and to allow the said feed to gravitate over said plate. Annular flange 10″ is formed on the lower surface of said plate and has arm notch 10ª formed therethrough. Said agitator plate has bearing rollers 10ᵇ rotatably mounted on its lower surface and bearing roller 10ᶜ rotatably mounted on the reduced inner end portion 12′ of agitator arm 12. Said arm is secured to said agitator plate by the insertion of said inner end portion 12′ in an aperture formed in the inner portion of flange 10″ and by lag screw 13, passed through an aperture through the center of agitator plate 10, short pipe nipple 14, and screwed into extension 2′ of trough bottom 2. Said nipple rests upon said trough extension and provides central support for agitator plate 10. The edge of said plate is supported by bearing rollers 10ᵇ and 10ᶜ. The central portion of arm 12 passes through arm notch 10ª for engaging said plate at this point and thereby reciprocatively rotating said plate on screw 13, as hereinafter described.

It will be seen in Fig. 1, that arm 12, extends from plate 10 almost to trough front 1, and that said arm is a slight distance above trough bottom 2, for allowing the arm to pass clear of obstructions, such as moistened feed and the like. Feed discharge opening 11 is regulated for controlling passage of feed therethrough, by the following described parts.

Referring to Figs. 1 and 2, vertical bin front 6 has longitudinal cleat 15 and vertical end cleats 15' secured on the inner surface thereof. Door guide 16 is secured on the inner surface of said cleats, forming a space between said door and said bin front 6. Door 17 is slidably suspended in said space. Said door is raised and lowered by lift rods 18, passed through brackets 19, and held therein at any desired height by thumb screws 20, screwed into said brackets against said rods. Said brackets are secured on the inner surfaces of bin ends 5. The lower ends of said lift rods are secured in the upper edge of said door.

On the upper edge of trough front 1, (see Fig. 1,) rests front fender bar 21, the two ends of which are bent L shaped, but one of said L shaped ends being shown at 21'. Each of said L shaped ends is pivotally secured to one of the trough ends 3, by bolts 22 secured therein by nuts 22', seen in Fig. 2. Rear fender bar 23 rests against bin front 6, (see Fig. 1,) and has its ends similarly shaped at 23' and detachably secured to trough ends 3 by thumb screws 24 and thumb nuts 24', seen in Fig. 2.

Fenders 25 are flat strips of metal extended transversely over the described trough, at suitable distances from each other to prevent animals from getting into said trough. The front ends of said fenders are substantially secured to front bar 21, while the rear ends of said fenders are similarly secured to rear bar 23.

In operation, with the parts in the position seen in Figs. 1 and 2, the lower edge of lid 9 is raised and granular feed, such as shelled corn, wheat, dry ground feed, or the like is poured into the described bin, onto bin bottom 4 and agitator plates 10. Door 17 is raised by rods 18, to such height as will allow proper discharge of feed thereunder, and is secured at such height by thumb screws 20, screwed into said brackets, against said rods.

Animals, not shown, feed from the described trough, and in so doing insert their noses between fenders 25, into the described trough, above trough front 1. In moving their noses about to get feed, their noses strike the outer portions of arms 12 and thereby reciprocatively rotate the agitator plates on screws 13. Said plates carry agitator lugs 10' reciprocatively, thereby agitating said feed and causing a portion of the same to gravitate through the described discharge opening 11, into the described trough. When it is desired to stop said gravitation of feed, thumb screws 20 are loosened, and door 17 gravitates onto the front edge portions of agitator plates 10.

When it is desired to clean the desired trough, thumb nuts 24' and thumb screw 24 are removed from trough ends 3 and L shaped portions 23' of rear fender bar 23, and the thus loosened bar, carrying the rear ends of fenders 25 is rotated upward and outward, together with front fender bar 21 pivotal on bolts 22, thus removing fenders 25 from over said trough, after which the same is cleaned in any well known manner.

While I have shown a certain order and arrangement of agitator lugs 10', it is evident that any number of lugs could be used on the upper surface of plate 10, and be placed in any suitable arrangement for agitating feed, and allowing the same to gravitate therefrom, and I reserve the right so to do.

Having fully described my invention, what I claim as new and desire to secure by Letters Patent, is:—

1. In a feed trough in combination, a trough having an inclined trough bottom therefor and an inclined extension formed with said trough bottom; a feed bin for said trough said bin having a vertical front and an inclined bin bottom the latter being mounted on said trough bottom extension with a feed discharge opening between the bottom edge of said bin front and the front edge of said bin bottom said bin bottom having an annular countersink and a countersink vent opening formed therein; an agitator plate covering said countersink and said vent opening; agitator lugs formed on the upper surface of said plate said lugs being adapted to agitate feed and to permit the same to gravitate therefrom over said agitator plate and through said discharge opening; pivotal securing means whereby said agitator plate is rotatably secured in place; reciprocative rotating means extending from said plate through said vent opening into said feed trough and discharge regulating means for said discharge opening.

2. In a feed trough provided with an inclined bottom therefor said trough bottom having an inclined extension formed therewith; a feed bin; an inclined bin bottom for said bin said bin bottom being secured on said trough bottom extension and having an annular countersink and a countersink vent opening formed therein; an agitator plate covering said countersink and said vent opening; agitator lugs formed on the upper surface of said plate said lugs being adapted to agitate feed and to permit the same to gravitate therefrom over said agitator plate; an annular flange formed on the lower surface of said agitator plate and extending downward therefrom into said countersink; pivotal securing means whereby said agitator plate is rotatably secured in place; rotating means for said agitator plate whereby the same is reciprocatively rotated; and anti-friction bearings in said countersink whereby the edge portion of said agitator plate is supported.

3. In a feed trough provided with a feed bin, an inclined bin bottom for said bin;

said bin bottom having a countersink therein and a vent opening through one edge of said bin bottom for venting said countersink; a bearing plate in the bottom of said countersink; stop lugs formed on the upper surface of said bearing plate; an agitator plate covering said countersink and also covering said vent opening said agitator plate having a flange formed on the lower surface thereof and an arm notch formed in the edge of said flange; an arm beneath said agitator plate said arm extending through said vent opening and arm notch and between said stop lugs; pivotal securing means through the central portion of said agitator plate and through said arm; and anti-friction bearings between said bearing plate and said agitator plate for supporting the edge portion of the latter.

In testimony whereof I affix my signature in the presence of two witnesses.

JACOB S. HAMILTON.

Witnesses:
H. M. WISSER,
JAS. E. FLEMING.

Copies of this patent may be obtained for five cents each, by addressing the "Commissioner of Patents, Washington, D. C."